United States Patent [19]

Masui et al.

[11] Patent Number: 5,672,309

[45] Date of Patent: Sep. 30, 1997

[54] METHOD FOR PRODUCING MOLDED ARTICLE OF FIBER REINFORCED THERMOPLASTIC RESIN

[75] Inventors: Shohei Masui, Nagoya; Takahisa Hara, Toyonaka; Masahito Matsumoto, Ibaraki; Nobuhiro Usui, Takatsuki; Shigeyoshi Matsubara, Osaka, all of Japan

[73] Assignee: Sumitomo Chemical Company, Limited, Osaka, Japan

[21] Appl. No.: 453,517

[22] Filed: May 30, 1995

Related U.S. Application Data

[63] Continuation of Ser. No. 104,610, Aug. 11, 1993, abandoned, which is a continuation of Ser. No. 821,136, Jan. 16, 1992, abandoned, which is a continuation of Ser. No. 475,407, Feb. 5, 1990, abandoned.

[30] Foreign Application Priority Data

Feb. 10, 1989 [JP] Japan ............... 1-032061
Mar. 31, 1989 [JP] Japan ............... 1-082674
May 31, 1989 [JP] Japan ............... 1-139797

[51] Int. Cl.⁶ ............................................. B32B 31/00
[52] U.S. Cl. ............... 264/257; 264/261; 264/274; 264/320; 264/324
[58] Field of Search ............... 264/257, 258, 264/261, 274, 46.5, 128, 244, 324, 322, 320; 156/214, 166, 312

[56] References Cited

U.S. PATENT DOCUMENTS

| | | | |
|---|---|---|---|
| 3,522,340 | 7/1970 | Corcoran | 264/244 |
| 4,025,686 | 5/1977 | Zion | 264/46.5 |
| 4,240,857 | 12/1980 | Della Vecchia et al. | 156/244.12 X |
| 4,379,103 | 4/1983 | Doerfling | 264/46.5 |
| 4,556,529 | 12/1985 | Muser | 264/257 |
| 4,560,523 | 12/1985 | Plumley | 264/257 |
| 4,572,856 | 2/1986 | Gembinski | 264/46.5 |
| 4,783,298 | 11/1988 | Oda | 264/257 |
| 4,933,131 | 6/1990 | Okey et al. | 264/257 |
| 4,986,948 | 1/1991 | Komiya | 264/257 |

FOREIGN PATENT DOCUMENTS

| | | | |
|---|---|---|---|
| 611163 | 12/1960 | Canada | 156/245 |
| 62-275727 | 11/1987 | Japan | 264/257 |
| 63-199620 | 8/1988 | Japan | 264/257 |

*Primary Examiner*—Jeff H. Aftergut
*Attorney, Agent, or Firm*—Birch, Stewart, Kolasch & Birch, LLP

[57] ABSTRACT

A molded article of a fiber-reinforced thermoplastic resin which suffers less deformation and has good appearance is produced by a method which includes the steps of:

supplying at least two porous fibrous sheets, supplying a resin melt of a thermoplastic resin in a space between the porous fibrous sheets, and forcing the resin melt to fill the pores of the porous sheets by resin supplying pressure and/or pressing pressure and to reach outer surfaces of the porous fibrous sheet.

16 Claims, 3 Drawing Sheets

METHOD FOR PRODUCING MOLDED ARTICLE OF FIBER REINFORCED THERMOPLASTIC RESIN

This application is a continuation, of application Ser. No. 08/104,610 filed on Aug. 11, 1993, now abandoned, which is a Rule 62 Cont. of Ser. No. 07/821,136 filed on Jan. 16, 1992, now abandoned, which is a Rule 62 Cont. of Ser. No. 07/475,407 filed Feb. 5, 1990, now abandoned.

BACKGROUND OF THE INVENTION

1. Field of the Invention

The present invention relates to a method for producing a molded article of a fiber-reinforced thermoplastic resin, and more particularly, it relates to a method for producing a molded article of a fiber-reinforced thermoplastic resin which is less deformed due to orientation of reinforcing fibers and has good appearance. The fiber-reinforced thermoplastic resin article can be used as various industrial materials including automobile parts such as an exterior panel, a structural material and a battery tray, and building materials such as an access floor.

2. Description of the Related Art

Hitherto, some methods for producing a fiber-reinforced thermoplastic resin article have been proposed and industrially employed. One of the typical methods comprises molding the fiber-reinforced thermoplastic resin article from resin pellets containing short-length fibers in conventional molding methods such as injection molding. Another method uses thermoplastic resin pellets which are reinforced with middle-length fibers having substantially the same length as the pellets and produces the fiber-reinforced molded article by the conventional molding methods such as injection molding.

Recently, a so-called stampable sheet technique become attractive. In this technique, a sheet of the reinforced thermoplastic resin is re-heated and press molded to produce a molded article. Depending on the types of reinforcing fibers, the stampable sheet technique is roughly classified into two classes. In one class, short-length fibers having a length of several mm to 100 mm and the thermoplastic resin powder are mixed by dry or wet blending, heated and roll pressed to form a stampable sheet, and the sheet is pre-heated and pressed to produce the fiber-reinforced thermoplastic resin article (cf. for example, Japanese Patent Kokai Publication No. 28135/1982). The other class relates to a stampable sheet comprising long-length reinforcing fibers. In this case, the thermoplastic resin is extruded and laminated on a knitted mat of the long-length fibers and roll pressed to form a stampable sheet, and then the sheet is pre-heated and pressed to produce the fiber-reinforced thermoplastic resin article.

However, each of the above techniques has its own technical and economical problems.

In the method using the resin pellet reinforced with the short-length fibers which is most commonly employed, improvement of the mechanical strength, which is the most important object of the fiber reinforcing, particularly the impact resistance, is not sufficient, although moldability, design applicability and the production cost of this technique, are superior to other techniques. The reason for the insufficient increase of the mechanical strength is that, the fibers are severely broken during two plasticizing and kneading steps, namely the step for mixing and dispersing the fibers and the resins (the granulating step), and the molding step. In addition, since the fibers flow together in the mold with the resin melt in the molding step, the orientation of the fibers remains in the molded article and causes large deformation. When the inorganic fibers are used, they will wear out the screws and cylinders of extruders and injection molding machines which are used for granulation and molding. Such wearing of the apparatuses increase the production cost of the molded article.

The method using the resin pellets reinforced with the middle-length fibers requires a specially designed extruder head, and the productivity is inferior to the method which uses the pellets reinforced with the short-length fibers. Therefore, the production cost increases. In addition, as in the case of the short-length fibers, the molded article tends to deform, and the screws and cylinders of the extruders and the injection molding machine are worn.

In the stampable sheet technique using the middle- or long-length fibers, since the fibers remaining in the article maintain their original length, the article has considerably high mechanical strength.

However, in the production of the stampable sheet reinforced with monofilaments having middle length, the thermoplastic resin should be used in the powder form. Therefore, the production cost increases due to the grinding of the resin mass. Further, in this case, specially designed expansive apparatuses such as a sheet forming machine, a roll press and a pre-heater are required. The fiber is less orientated than in case of the methods using the fiber reinforced pellets, but still there remains fiber orientation in the article, whereby the article may deform.

In the production of the stampable sheet reinforced with the long-length fibers, since only the resin melt flows but not the fibers during molding, peripheral parts of the molded article contain no fiber, whereby the strength of the article becomes unstable. In addition, since the bundled fibers are used, the article has a rough surface. As in the case of the stampable sheet reinforced with the middle-length fibers, the specially designed expensive apparatuses are required.

SUMMARY OF THE INVENTION

One object of the present invention is to provide a fiber-reinforced thermoplastic resin article which has improved mechanical strength and good appearance and is less deformed.

Another object of the present invention is to provide a method for producing a molded article of a fiber-reinforced thermoplastic resin at a lower production cost.

According to the present invention, there is provided a method for producing a molded article of a fiber-reinforced thermoplastic resin, which comprises steps of:

supplying at least two porous fibrous sheets, supplying a resin melt of a thermoplastic resin in a space between said porous fibrous sheets, and forcing said resin melt to fill the pores of the porous sheets by resin supplying pressure and/or pressing pressure and to reach outer surfaces of said porous fibrous sheet.

DETAILED DESCRIPTION OF THE DRAWINGS

The present invention will be explained by making reference to the accompanying drawings.

Figure 1A:
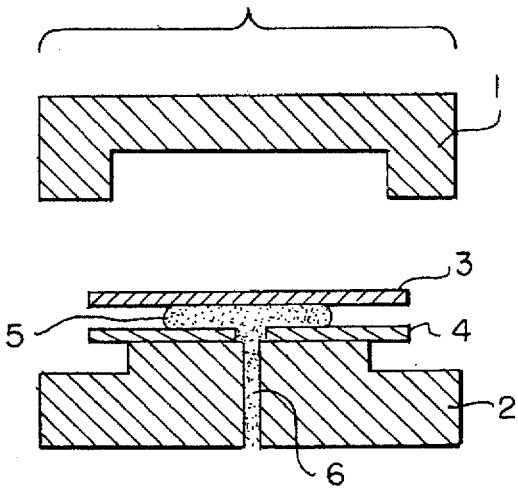
FIGS. 1A and 1B schematically show a first embodiment of the method of the present invention, FIGS. 2A and 2B schematically show a second embodiment of the method of the present invention, FIGS. 3A and 3B schematically show a third embodiment of the method of the present invention.
Figure 1B:
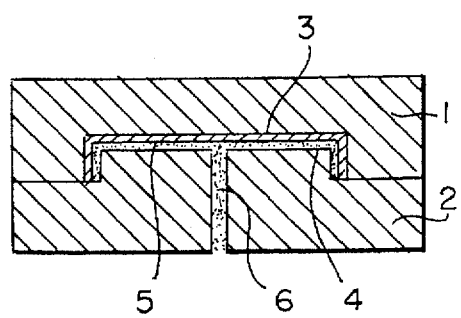

In a first embodiment of FIG. 1, a pair of porous fibrous sheets 3, 4 are placed on a lower mold 2 of an unclosed mold consisting of an upper mold 1 and the lower mold 2. A mass of resin melt 5 is supplied through a resin supplying conduit 6 into a space between the porous fibrous sheets 3, 4 as shown in FIG. 1A. To this end, the lower sheet has a hole at an area corresponding to an opening of the conduit 6. After or during the supplying of the resin melt, the molds 1, 2 are closed as shown in FIG. 1B to press the resin melt and produce the fiber-reinforced molded article.

To produce an article having a complicated shape by the above method, before the supplying of the resin melt, the molds are once closed. Then, as soon as the supplying of the resin melt starts, the molds are opened, and after finishing the the supplying of resin, the molds are again closed to mold the resin. Thereby, the resin melt is surely supplied between the porous fibrous sheet.

Figure 2A:
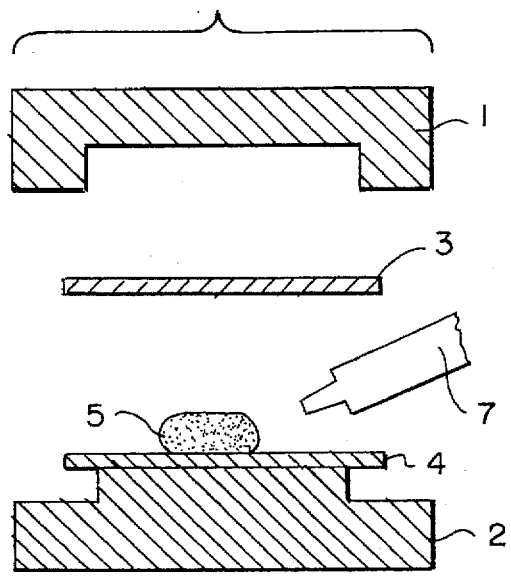
Figure 2B:
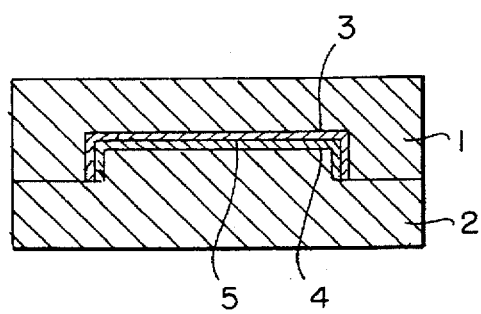

In a second embodiment of FIG. 2, one porous fibrous sheet 4 is placed on the lower mold 2 and a mass of the resin melt is supplied from a supplying means 7 on the sheet 4 as shown in FIG. 2A. Then, the other sheet 3 is placed on the supplied resin melt and the molds are closed to press the resin melt and produce the fiber-reinforced molded article.

Figure 3A:
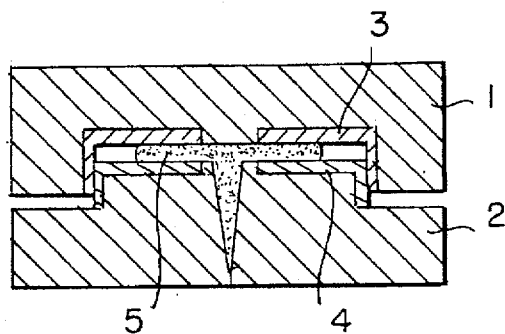
Figure 3B:
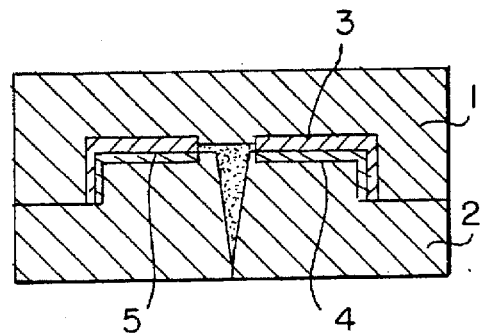

In a third embodiment as shown in FIGS. 3 A and 3B, the resin supply conduit opens in the space between the porous fibrous sheets 3, 4.

When the resin melt is supplied through the conduit formed in the mold wall, the air is less trapped in the molded article and a time for each production cycle can be shortened.

The porous fibrous sheet may be produced from various kinds of fibers. Examples of the fibers are inorganic fibers (e.g. glass fiber, carbon fiber, stainless steel fiber, etc.), organic fibers (e.g. polyamide fiber, polyester fiber, aramid fiber, etc.) and mixtures thereof. When the glass fiber is used, the molded article is produced in a low cost and has good reinforcing effects. In general, the fiber has a diameter of 1 to 50 μm.

The fiber may be a monofilament or a bundled fiber consisting of several ten to several hundred monofilaments bundled with a sizing agent. The fibrous sheet may contain a binder for maintaining the sheet form in an amount of 0.3 to 50% by weight based on the weight of the fibers. Examples of the binder are polyvinyl alcohol, epoxy resins and the like.

By the present invention, any of the conventional thermoplastic resins may be molded. Specific examples of the thermoplastic resin to be molded by the present invention are polyethylene, polypropylene, polystyrene, polyvinyl chloride, ABS resin, polyacrylonitrile, polyamide, polycarbonate, polyethylene terephthalate, and mixtures and polymer alloys thereof. The thermoplastic resin may contain conventional additives such as a heat stabilizer, a UV light absorber, a colorant and an inorganic filler.

The plural fibrous sheets may be made of the same type of fiber or different types of fibers depending on the final use of the molded article and required properties.

In a preferred embodiment, the outermost porous sheet consists of a continuous or discontinuous monofilament.

In the method of the present invention, the resin melt passed through pores of the porous fibrous sheets during molding. Since the flow resistance is large and, in case of the inorganic fibers, the heat is deprived from the resin melt so that the temperature of the resin melt is decreased, the flowability of the resin melt is deteriorated and the resin melt may not reach the outer surface of the fibrous sheet. To prevent this, the fibrous sheets are heated to a temperature of 60° C. or higher before the resin melt is supplied.

According to the present invention, the entire surface of the molded article is reinforced with the reinforcing fibers without breakage of the fibers.

Since the resin melt flows from the inner surface to the outer surface of the fibrous sheet, no or little bubbles remain in the molded article so that the article is strongly reinforced.

In addition, since the fibers do not flow together with the flow of the resin melt during molding, the fibers are not orientated. Thereby, the molded article suffers less warp or deformation.

When the outermost porous fibrous sheet consists of discontinuous monofilament fibers, the molded article has a smooth appearance.

When the outermost porous fibrous sheet consists of a continuous monofilament fiber, the molded article has a smooth appearance and the molded article having a complicated shape with deep drawing can be produced.

The present invention will be illustrated by the following Examples. The test methods used in Examples are as follows:

Flexural Test

A three-point bending test according to JIS K 7203, which defines a testing method for flexural properties of rigid plastics.

Falling Weight Impact Test

Figure 5:
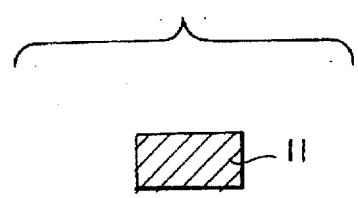

This test is carried out by using the apparatus shown in FIG. 5. The apparatus comprises frame 15.

On a test piece 14 (50 mm×50 mm×2 mm) cut out from the glass fiber-reinforced molded article, an impact piece 12 is placed. On the impact piece, a weight 11 is dropped from a certain height. The lowest height at which the test piece is broken is regarded as a breaking height, from which a destructive energy is calculated according to the equation:

Destructive energy (Kg·cm)=Weight (kg)×Breaking height (cm)

The destructive energy is used to express the impact strength.

Deformation of the Molded Article

Figure 4:
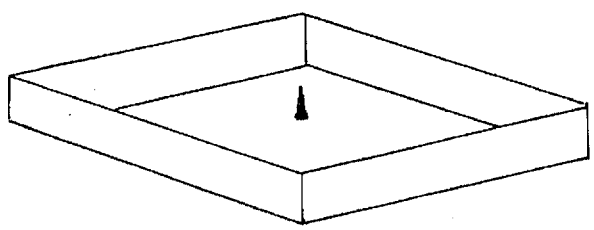
FIG. 4 is a perspective view of a molded article produced in one embodiment of the present invention, FIG. 5 schematically shown an apparatus used in the falling weight impact strength test, FIGS. 6A to 6D schematically show a fourth embodiment of the method of the present invention.

The molded article having the shape of FIG. 4 is placed on a flat plate with contacting the bottom of the article to the plate. Each corner is pressed against the plate and a distances between the plate and the bottom of each of other corners is measured. The maximum distance is used to express a degree of deformation.

Appearance of the Molded Article

A surface roughness tester (an ultra roughness tester SURFCOM manufactured by Toyo Seimitsu, Co., Ltd.) is used to measure the surface roughness of the molded article.

EXAMPLE 1

A vertical press molding machine with a mold locking force of 200 tons having a horizontal injection element was used to mold a fiber-reinforced article. A mold consisted of an upper mold half and a lower mold half, and the lower mold half had, at its center part, a resin supplying conduit having a diameter of 2 mm. The mold was designed to produce a box-shaped article as shown in FIG. 4 having a length of 200 mm, a width of 200 mm, a depth of 20 mm and a wall thickness of 2.0 mm.

As a porous fibrous sheet, Unifilo Sheet U 605-450 (manufactured by Vetrotex International) was used, which sheet was made by, piling rovings of long-length glass fibers without orientation.

A pair of the porous fibrous glass fiber sheets were laminated. At the center part of the lower sheet corresponding to the opening of the resin supplying conduit in the lower mold half, a hole having a diameter of 10 mm was made prior to lamination. Then, the sheets were placed on the lower mold half and preheated to 60° C. A mass of melt thermoplastic resin (Sumitomo Noblen AX 568 manufactured by Sumitomo Chemical Co., Ltd.; a polypropylene resin having a melt flow index of 65 g/10 min.) was supplied through the resin supplying conduit and the hole into a space between the pair of the glass fiber sheets. Then, the mold was closed to mold the resin at a pressure of 100 kg/cm$^2$ to produce a box-shaped molded article as shown in FIG. 4.

The test results are shown in the Table. As understood from the results, the molded article had very good mechanical strength.

EXAMPLES 2 TO 6

In the same manner as in Example 1 but using the porous fibrous sheets shown in the Table and preheating the sheets at a temperature indicated in the Table, a fiber-reinforced molded article was produced. The test results are shown in the Table. The article had good mechanical strength and surface appearance.

EXAMPLE 7

Porous fibrous sheets shown in the Table were used.

The lower sheet was placed on the lower mold half and preheated to 60° C. On the preheated lower sheet, a mass of resin melt was supplied from outside the mold by means of a portable extruder (manufacture by Kobe Steel, Ltd.; equipped with an accumulator; a cylinder diameter of 50 mm). Then, the upper sheet was place on the supplied resin melt, and the mold was closed. The test results are shown in the Table. As understood from the results, the molded article had good mechanical strength and surface appearance.

EXAMPLE 8

A bundle of about 2000 glass fibers each of which had a diameter of 10 μm and which were bundled with 0.2% by weight of vinylsilane was passed between a pair of metallic rolls, and the fibers were spreaded by blowing the air against the fiber bundle at a wind speed of 3 to 5 mm/sec. with a blower placed at an entering or exiting site of the rolls. The spreaded fibers were homogeneously piled and filled without orientation in a wooden frame surrounding the periphery of an iron plate. On the piled fibers, a 10% aqueous solution of polyvinyl alcohol as a binder was sprayed, and the wooden frame was removed. Then, the piled fibers were dried in a heat press at 200° C. to form a non-woven porous sheet made of long-length glass monofilaments (200 g/m$^2$).

Four porous glass sheets are laminated. A hole having a diameter of 10 mm was made prior to lamination at the center part of each of the lower two sheets corresponding to the opening of the resin supplying conduit in the lower mold half. Then, the sheets were preheated to 60° C. and placed on the lower mold half (FIG. 1A). A mass of melt thermoplastic resin (Sumitomo Noblen AX 568) was supplied through the resin supplying conduit and the holes into the spaces between the upper and lower pairs of the glass fiber sheets. Then, the mold was closed to mold the resin at a pressure of 100 kg/cm$^2$ (FIG. 1B) to produce a molded article.

The test results are shown in the Table. As understood from the results, the molded article had very good mechanical strength.

EXAMPLE 9

Figure 7:
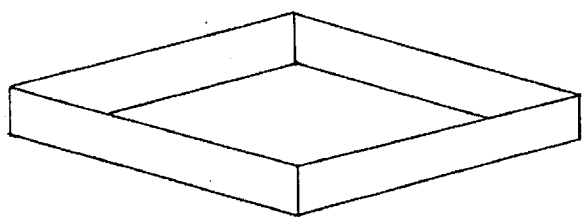
FIG. 7 is a perspective view of a molded article produced in another embodiment of the present invention.
Figure 7:
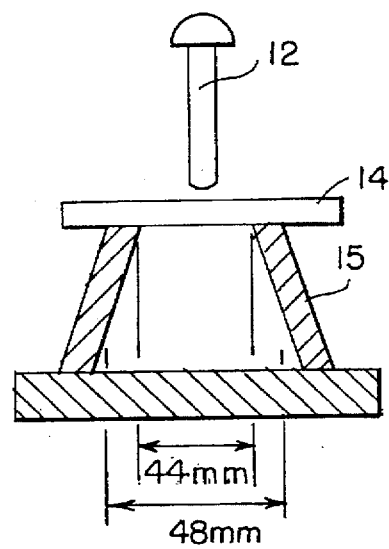

A vertical press molding machine with a mold locking force of 200 tons having a horizontal injection element was used to mold a fiber-reinforced article. A mold consisted of an upper male mold and a lower female mold, and the female mold had, at its center part, a resin supplying conduit having a diameter of 2 mm (see FIG. 6A). The mold was designed to mold a box-shaped article as shown in FIG. 7 having a length of 200 mm, a width of 200 mm, a depth of 40 mm and a wall thickness of 2.0 mm.

As a porous fibrous sheet, the same Unifilo Sheet U 605-450 as used in Example 1 was used.

Figure 6A:
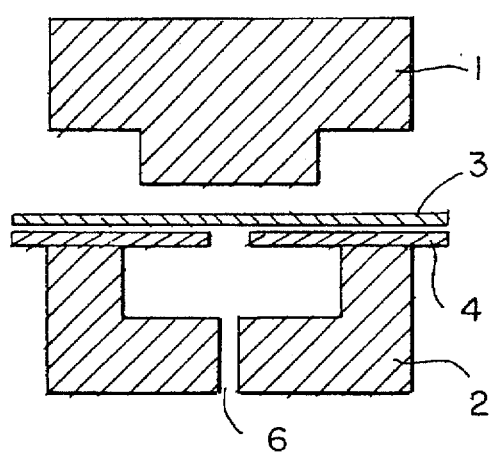
Figure 6B:
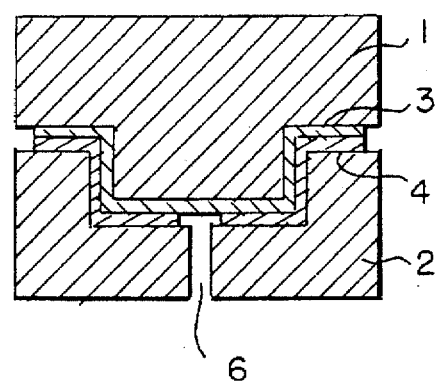
Figure 6C:
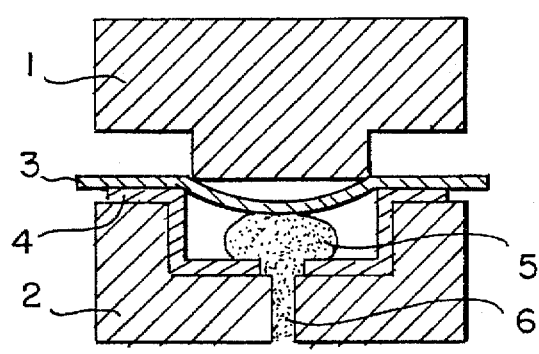
Figure 6D:
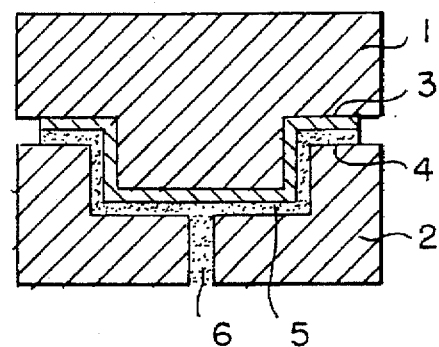

A pair of the porous fibrous glass fiber sheets were laminated. At the center part of the lower sheet, corresponding to the opening of the resin supplying conduit in the lower mold half, a hole having a diameter of 10 mm was made prior to lamination (FIG. 6A). Then, the sheets were preheated to 60° C. and placed on the lower mold half, and the mold was closed (FIG. 6B). A mass of melt thermoplastic resin (Sumitomo Noblen AX 568) was supplied through the resin supplying conduit and the hole into a space between the pair of the glass fiber sheets while the mold was opened at a rate of 15 mm/sec. till the distance between the male and female molds reached 10 mm (FIG. 6C). Then, the mold was again closed to mold the resin at a pressure of 100 kg/cm$^2$ (FIG. 6D) to produce a box-shaped molded article as shown in FIG. 7.

The test results are shown in the Table. As understood from the results, the molded article had very good mechanical strength.

EXAMPLE 10

In the same manner as in Example 9 but using the porous fibrous sheets shown in the Table and preheating the sheets at a temperature indicated in Table, a fiber-reinforced molded article was produced. The test results are shown in the Table. The article had good mechanical strength and surface appearance.

COMPARATIVE EXAMPLES 1 AND 2

In the same manner as in Example 1 but using, as a thermoplastic resin, Sumitomo Noblen AX 568 (Comparative Example 1) or glass fiber filled polypropylene pellets (Sumitomo Noblen GHH 43 manufacture by Sumitomo Chemical Co., Ltd.; glass fiber content: 30% by weight) but no porous fibrous sheet, a fiber-reinforced molded article was produced. The test results are shown in the Table.

COMPARATIVE EXAMPLE 3

In the same manner as in Example 9 but supplying the resin melt while the mold was opened and the closing the mold, a molded article was produced. The resin melt was supplied only under the outer surface of the lower fibrous sheet but not supplied between the fibrous sheets. The molded article was severely deformed and a degree of deformation could not be measured.

during or after supply of the melt mass of the thermoplastic resin, closing the molds and pressing the melt mass of the thermoplastic resin, wherein the melt mass of the thermoplastic resin is filled into the pores of the

TABLE

| Example No. | Combination of glass fiber sheets*[1] | | Resin | Preheat temp. of sheet (°C.) | Impact strength (kg.cm) | Flexural strength | | Deformation (mm) | Surface roughness (μm) |
|---|---|---|---|---|---|---|---|---|---|
| | Upper sheet (upper side/ lower side) | Lower sheet upper side/ lower side) | | | | Flexural strength (kg/cm$^2$) | Flexural rigidity (kg/cm$^2$) | | |
| 1 | U 605-450 | U 605-450 | AX 568 | 60 | 240 | 1250 | 52,000 | 3 | 38 |
| 2 | VHM 5200/VHM 5200 | VHM 5200/VHM 5200 | ↑ | 60 | 200 | 1200 | 48,000 | 1 | 5 |
| 3 | VHM 5200/U 816-300 | U 816-300/VHM 5200 | ↑ | 60 | 280 | 1300 | 53,000 | 3 | 10 |
| 4 | VHM 5075/U 605-450 | U 605-450/VHM 5075 | ↑ | 60 | 310 | 1300 | 55,000 | 4 | 22 |
| 5 | VHM 5200/VHM 5200 | VHM 5200/VHM 5200 | ↑ | 20 | 200 | 1200 | 48,000 | 1 | 8 |
| 6 | VHH 5200/VHM 5200 | VHM 5200/VHM 5200 | ↑ | 150 | 200 | 1200 | 48,000 | 1 | 3 |
| 7 | VHM 5200/VHM 5200 | VHM 5200/VHM 5200 | ↑ | 60 | 200 | 1200 | 49,000 | 1 | 6 |
| 8 | (Laminated porous fibrous sheets) | | ↑ | 60 | 230 | 1250 | 47,000 | 1 | 6 |
| 9 | U 605-450 | U 605-450 | ↑ | 60 | 240 | 1250 | 52,000 | 3 | 38 |
| 10 | VHM 5200/VHM 5200 | VHM 5200/VHM 5200 | ↑ | 60 | 200 | 1200 | 48,000 | 1 | 5 |
| C. 1 | — | — | AX 568 | — | 25 | 370 | 14,500 | 2 | 3 |
| C. 2 | — | — | GHH 43 | — | 40 | 1100 | 55,000 | 27 | 6 |

Note: *[1] U 605-450: Unifilo Sheet U 605-450 manufacture by Vetrotex International, 450 g/m$^2$, made of bundled long-length glass fibers.
U 816-300: Unifilo Sheet U 816-300 manufacture by Vetrotex International, 300 g/m$^2$, made of bundled long-length glass fibers.
VHM 5075: Cumlas Sheet VHM 5075 manufactured by Nippon Bileen, 75 g/m$^2$, made of glass monofilaments with a diameter of 10 μm and length of 13 mm.
VHM 5200: Cumlas Sheet VHM 5200 manufactured by Nippon Bileen, 200 g/m$^2$, made of glass monofilaments with a diameter of μm and a length of 13 mm.
Laminated porous fibrous sheets: A pair of non-woven sheets of long-length glass monofilaments (200 g/m$^2$)
AX 568: Noblen AX 568 manufactured by Sumitomo Chemical Co., Ltd., a polypropylene resin having a melt flow index of 65 g/10 min.
Ghh 43: Polypropylene manufacture by Sumitomo Chemical Co., Ltd., glass fiber content: 30% by weight

What is claimed is:

1. A method for producing a molded article of a fiber-reinforced thermoplastic resin, comprising the steps of:
   supplying at least two porous fibrous sheets between a pair of male and female molds which are unclosed;
   supplying a melt mass of a thermoplastic resin in a space between said porous sheets; and
   closing the molds and pressing the melt mass of the thermoplastic resin, wherein the melt mass of the thermoplastic resin is filled into the pores of the porous fibrous sheets by a pressing pressure generated by the mold closing, such that the sheets become united together.

2. The method according to claim 1, wherein an outermost porous fibrous sheet consists of a continuous monofilament.

3. The method according to claim 1, wherein an outermost porous fibrous sheet consists of discontinuous monofilaments.

4. The method according to claim 1, further comprising heating at least one of said porous fibrous sheets to a temperature of at least 60° C., prior to said supplying of said melt mass.

5. A method for producing a molded article of a fiber-reinforced thermoplastic resin, comprising the steps of:
   placing, in a space between a pair of male and female molds which are unclosed, at least one porous fibrous sheet having a hole formed at a position corresponding to an opening of a conduit provided in one of the molds for supplying a melt mass of a thermoplastic resin and at least one other porous sheet which may have a hole and is laminated on said at least one porous fibrous sheet having a hole;
   supplying a melt mass of a thermoplastic resin in a space between said porous sheets through the conduit; and
   closing the molds and pressing the melt mass of the thermoplastic resin, wherein the melt mass of the thermoplastic resin is filled into the pores of the porous fibrous sheets by a pressing pressure generated by the mold closing, such that the sheets become united together.

6. The method according to claim 5, wherein an outermost porous fibrous sheet consists of a continuous monofilament.

7. The method according to claim 5, wherein an outermost porous fibrous sheet consists of discontinuous monofilaments.

8. The method according to claim 5, further comprising heating at least one of said porous fibrous sheets to a temperature of at least 60° C., prior to said supplying of said melt mass.

9. A method for producing a molded article of a fiber-reinforced thermoplastic resin, comprising the steps of:
   placing, in a space between a pair of male and female molds which are unclosed, at least one porous fibrous sheet having a hole formed at a position corresponding to an opening of a conduit provided in one of the molds for supplying a melt mass of a thermoplastic resin and at least one other porous sheet which may have a hole and is laminated on said at least one porous fibrous sheet having a hole;
   closing the molds to compress the porous fibrous sheets;
   supplying a melt mass of a thermoplastic resin in a space between said porous sheets through the conduit while opening the molds; and
   reclosing the molds before finishing supply of the melt mass of the thermoplastic resin and completing the mold closing at or after the finish of supply of the melt mass of the thermoplastic resin, wherein the melt mass of the thermoplastic resin is filled into the pores of the porous fibrous sheets by a pressing pressure generated by the mold closing, such that the sheets become united together.

10. The method according to claim 9, wherein an outermost porous fibrous sheet consists of a continuous monofilament.

11. The method according to claim 9, wherein an outermost porous fibrous sheet consists of discontinuous monofilaments.

12. The method according to claim 9, further comprising heating at least one of said porous fibrous sheets to a temperature of at least 60° C., prior to said supplying of said melt mass.

13. A method for producing a molded article of a fiber-reinforced thermoplastic resin, comprising the steps of:

placing, in a space between a pair of male and female molds which are unclosed, at least one porous fibrous sheet having a hole formed at a position corresponding to an opening of a conduit provided in one of the molds for supplying a melt mass of a thermoplastic resin and at least one other porous sheet which may have a hole and is laminated on said at least one porous fibrous sheet having a hole;

closing the molds to compress the porous fibrous sheets;

supplying a melt mass of a thermoplastic resin in a space between said porous sheets through the conduit while opening the molds; and after supply of the melt mass of the thermoplastic resin, reclosing the molds, wherein the melt mass of the thermoplastic resin is filled into the pores of the porous fibrous sheets by a pressing pressure generated by the mold closing, such that the sheets become united together.

14. The method according to claim 13, wherein an outermost porous fibrous sheet consists of a continuous monofilament.

15. The method according to claim 13, wherein an outermost porous fibrous sheet consists of discontinuous monofilaments.

16. The method according to claim 13, further comprising heating at least one of said porous fibrous sheets to a temperature of at least 60° C., prior to said supplying of said melt mass.

* * * * *